US012770984B2

(12) United States Patent
Murata et al.

(10) Patent No.: US 12,770,984 B2
(45) Date of Patent: Oct. 20, 2026

(54) NON-AQUEOUS ELECTROLYTE SECONDARY BATTERY

(71) Applicant: Panasonic Holdings Corporation, Osaka (JP)

(72) Inventors: Ichiro Murata, Hyogo (JP); Hiroaki Imanishi, Hyogo (JP); Yukinobu Miyamura, Hyogo (JP); Hiroshi Takamatsu, Hyogo (JP)

(73) Assignee: Panasonic Holdings Corporation, Osaka (JP)

( * ) Notice: Subject to any disclaimer, the term of this patent is extended or adjusted under 35 U.S.C. 154(b) by 927 days.

(21) Appl. No.: 17/787,090

(22) PCT Filed: Nov. 20, 2020

(86) PCT No.: PCT/JP2020/043374

§ 371 (c)(1),
(2) Date: Jun. 17, 2022

(87) PCT Pub. No.: WO2021/124796

PCT Pub. Date: Jun. 24, 2021

(65) Prior Publication Data

US 2022/0384915 A1 Dec. 1, 2022

(30) Foreign Application Priority Data

Dec. 19, 2019 (JP) ................................ 2019-229169

(51) Int. Cl.
*H01M 50/533* (2021.01)
*H01M 10/0587* (2010.01)
(Continued)

(52) U.S. Cl.
CPC ..... *H01M 50/533* (2021.01); *H01M 10/0587* (2013.01); *H01M 50/103* (2021.01);
(Continued)

(58) Field of Classification Search
CPC ............ H01M 50/533; H01M 50/538; H01M 50/553; H01M 50/574; H01M 10/0587;
(Continued)

(56) References Cited

U.S. PATENT DOCUMENTS

2012/0094170 A1* 4/2012 Byun ................. H01M 50/536 429/185
2012/0196166 A1* 8/2012 Kim ................. H01M 10/0413 429/94
(Continued)

FOREIGN PATENT DOCUMENTS

CN 206574809 U 10/2017
CN 109428042 A 3/2019
(Continued)

OTHER PUBLICATIONS

English translation of Yamamoto et al. (JP-2014139906-A). (Year: 2014).*
(Continued)

*Primary Examiner* — Jonathan G Leong
*Assistant Examiner* — Drew C Newman
(74) *Attorney, Agent, or Firm* — Rimon P.C.

(57) ABSTRACT

A non-aqueous electrolyte secondary battery includes: an electrode assembly including a positive and negative electrode plate; a rectangular outer casing having an opening; a sealing plate; an electrode terminal on the sealing plate; a first current collector connected to the electrode terminal; an insulation member; a second current collector connected to the first current collector; and a tab group extending from the electrode assembly toward the side wall and connected to the second current collector. The second current collector is a flat plate including a surface parallel to the side wall. The tab group is connected to the second current collector, and is bent at a connection portion with the second current
(Continued)

collector such that the bent tab group extends parallel to the side wall. The second current collector is positioned on the first current collector by a guide portion extending from the insulation member.

7 Claims, 13 Drawing Sheets

(51) Int. Cl.
*H01M 50/103* (2021.01)
*H01M 50/176* (2021.01)
*H01M 50/183* (2021.01)
*H01M 50/538* (2021.01)

(52) U.S. Cl.
CPC ....... *H01M 50/176* (2021.01); *H01M 50/183* (2021.01); *H01M 50/538* (2021.01)

(58) Field of Classification Search
CPC ............. H01M 50/103; H01M 50/176; H01M 50/183; H01M 50/184; Y02P 70/50
See application file for complete search history.

(56) References Cited

U.S. PATENT DOCUMENTS

| | | | | |
|---|---|---|---|---|
| 2015/0303439 | A1* | 10/2015 | Bae | H01M 50/528<br>429/61 |
| 2017/0025669 | A1* | 1/2017 | Urano | H01M 50/574 |
| 2019/0067667 | A1 | 2/2019 | Jang et al. | |
| 2019/0067728 | A1* | 2/2019 | Kwak | H01M 50/567 |
| 2019/0273277 | A1 | 9/2019 | Wakimoto et al. | |
| 2020/0251694 | A1 | 8/2020 | Wakimoto | |

FOREIGN PATENT DOCUMENTS

| | | | | |
|---|---|---|---|---|
| JP | 2014139906 | A | * | 7/2014 |
| JP | 2016-085875 | A | | 5/2016 |
| JP | 2019-061779 | | | 4/2019 |
| KR | 10-2371196 | | | 3/2022 |
| WO | WO-2017056733 | A1 | * | 4/2017 |
| WO | WO-2018062231 | A1 | * | 4/2018 |
| WO | 2018/155522 | A1 | | 8/2018 |

OTHER PUBLICATIONS

English machine translation of Sawada et al. (WO-2017056733-A1). (Year: 2017).*
English machine translation of Kamada et al. (WO-2018062231-A1). (Year: 2018).*
Indian Hearing Notice dated Jan. 30, 2025 issued in the corresponding Indian Patent Application No. 202247039975.
Indian First Examination Report dated Oct. 20, 2022 issued in the corresponding Indian Patent Application No. 202247039975, with English translation.
Extended European Search Report dated Feb. 12, 2024 issued in the corresponding European Patent Application No. 20902134.4.
International Search Report issued in International Patent Application No. PCT/JP2020/043374, dated Feb. 9, 2021, with English translation.

* cited by examiner

- Prior Art -

- Prior Art -

- Prior Art -

- Prior Art -

- Prior Art -

NON-AQUEOUS ELECTROLYTE SECONDARY BATTERY

CROSS-REFERENCE OF RELATED APPLICATIONS

This application is the U.S. National Phase under 35 U.S.C. § 371 of International Patent Application No. PCT/JP2020/043374, filed on Nov. 20, 2020, which in turn claims the benefit of Japanese Patent Application No. 2019-229169, filed on Dec. 19, 2019, the entire disclosures of which Applications are incorporated by reference herein.

TECHNICAL FIELD

The present disclosure relates to non-aqueous electrolyte secondary batteries.

BACKGROUND ART

For a non-aqueous electrolyte secondary battery such as a lithium-ion battery, a configuration is known in which tab groups extending from an electrode assembly housed in a rectangular outer casing are connected via current collectors to external terminals provided on a sealing plate.

Patent Document 1 discloses a current collector composed of a base located between a sealing plate and an electrode assembly and legs each extending from an end of the base toward a bottom of an outer casing along a side wall of the outer casing. The base is connected to an external terminal, and the legs are connected to an electrode plate stack (tab group) extending from the electrode assembly.

CITATION LIST

Patent Document

PATENT DOCUMENT 1: Japanese Unexamined Patent Publication No. 2016-85875

SUMMARY OF THE INVENTION

In the current collector disclosed in Patent Document 1, the legs are located between the electrode assembly and the side walls of the outer casing. Therefore, the space where the legs are located becomes a dead space that does not contribute to power generation, which causes reduction in volumetric energy density of the battery.

A non-aqueous electrolyte secondary battery according to the present disclosure includes: an electrode assembly including a positive electrode plate and a negative electrode plate; a rectangular outer casing having an opening and housing the electrode assembly; a sealing plate sealing the opening; an electrode terminal located on the sealing plate; a first current collector located between the electrode assembly and the sealing plate and connected to the electrode terminal; an insulation member located between the sealing plate and the first current collector; a second current collector located between the electrode assembly and a side wall of the rectangular outer casing and connected to the first current collector; and a tab group extending from the electrode assembly toward the side wall and connected to the second current collector. The second current collector is a flat plate including a surface parallel to the side wall. The tab group is connected to the second current collector, and is bent at a connection portion with the second current collector such that the bent tab group extends parallel to the side wall, and the second current collector is positioned on the first current collector by a guide portion extending from the insulation member.

The present disclosure can provide a non-aqueous electrolyte secondary battery having a high volumetric energy density and an easy-to-assembly structure.

DESCRIPTION OF EMBODIMENTS

The applicant discloses the structure of a non-aqueous electrolyte secondary battery in the specification of an earlier application (Japanese Patent Application No. 2019-174878).

Figure 1:
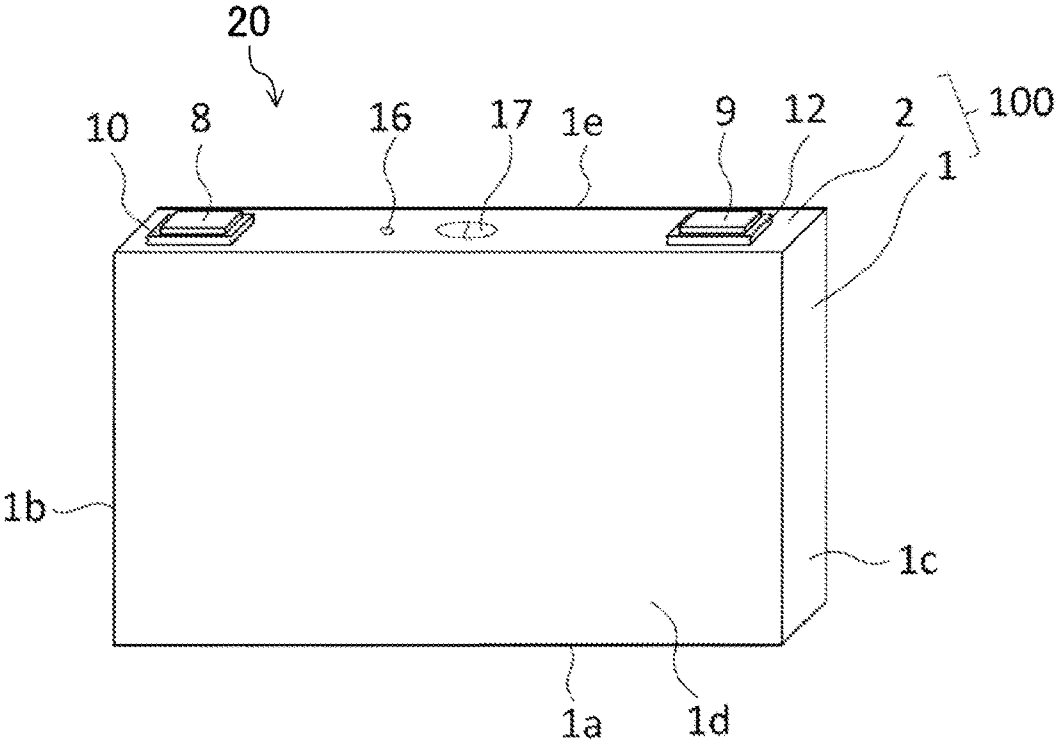
FIG. 1 is a perspective view of a non-aqueous electrolyte secondary battery.
Figure 2:
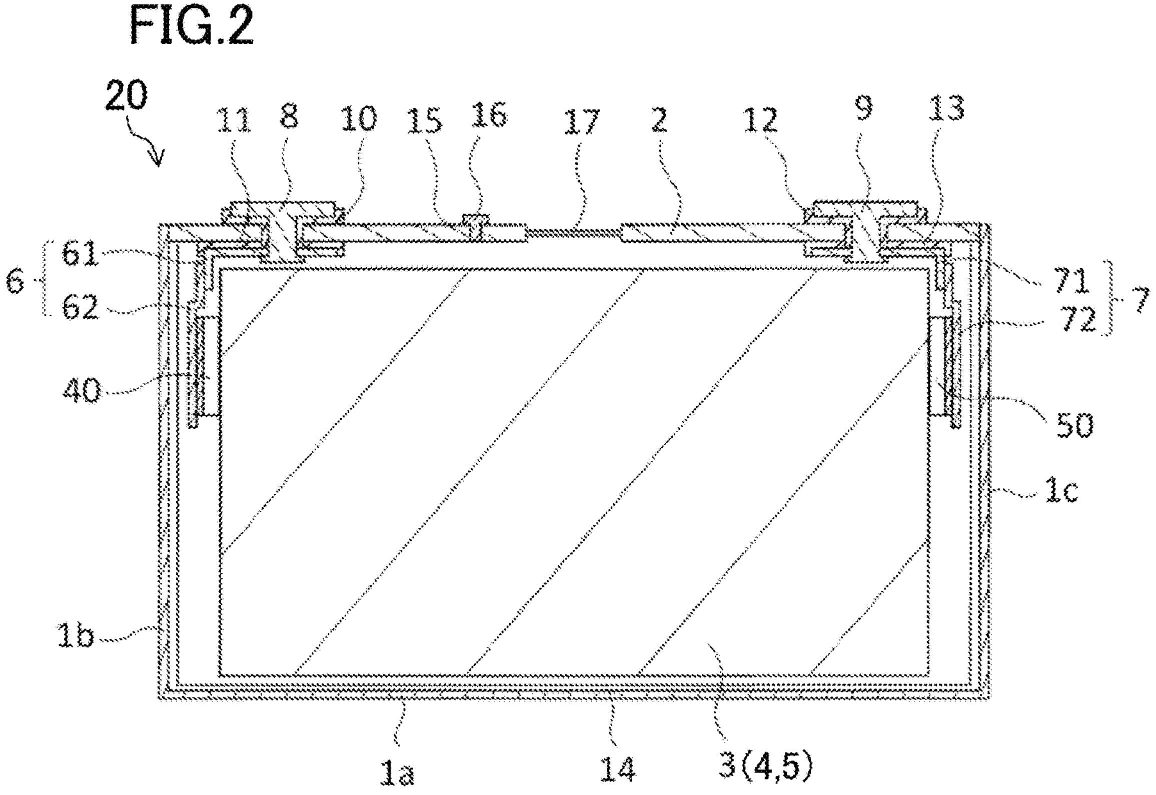
FIG. 2 is a sectional view showing the internal structure of a non-aqueous electrolyte secondary battery according to an earlier application.

As shown in FIGS. 1 and 2, in a non-aqueous electrolyte secondary battery 20 disclosed in the above specification, a tab group 40 of an electrode assembly 3 housed in a rectangular outer casing 1 and an electrode terminal 8 provided on a sealing plate 2 are electrically connected to each other by a first current collector 61 and a second current collector 62.

The first current collector 61 is disposed between the electrode assembly 3 and the sealing plate 2 and is connected to the electrode terminal 8. The second current collector 62 is a flat plate disposed between the electrode assembly 3 and a side wall 1*b* of the rectangular outer casing 1 and having a surface parallel to the side wall 1*b*, and is connected to the first current collector 61.

Figure 3:
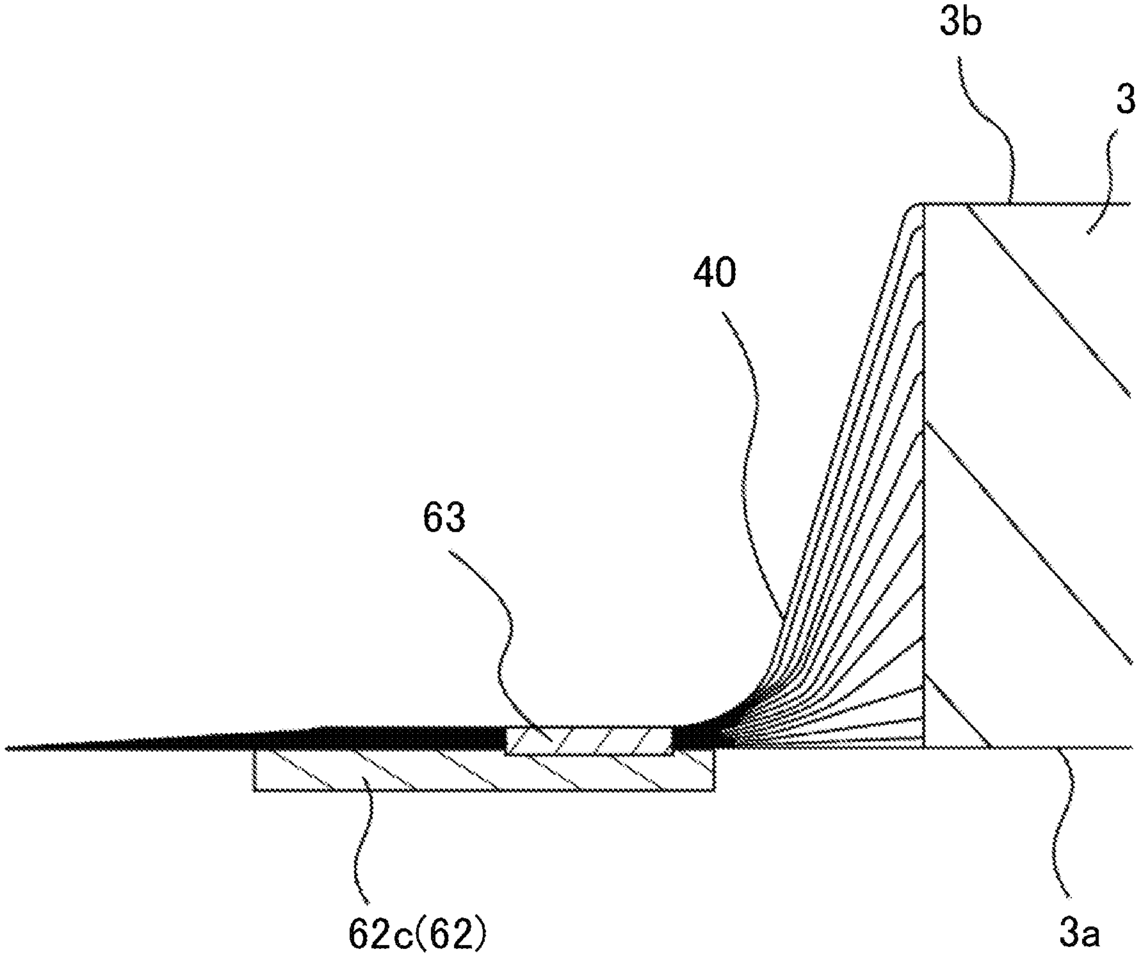
FIG. 3 shows a portion near a connection portion between a second current collector and a tab group before the tab group is bent.
Figure 4:
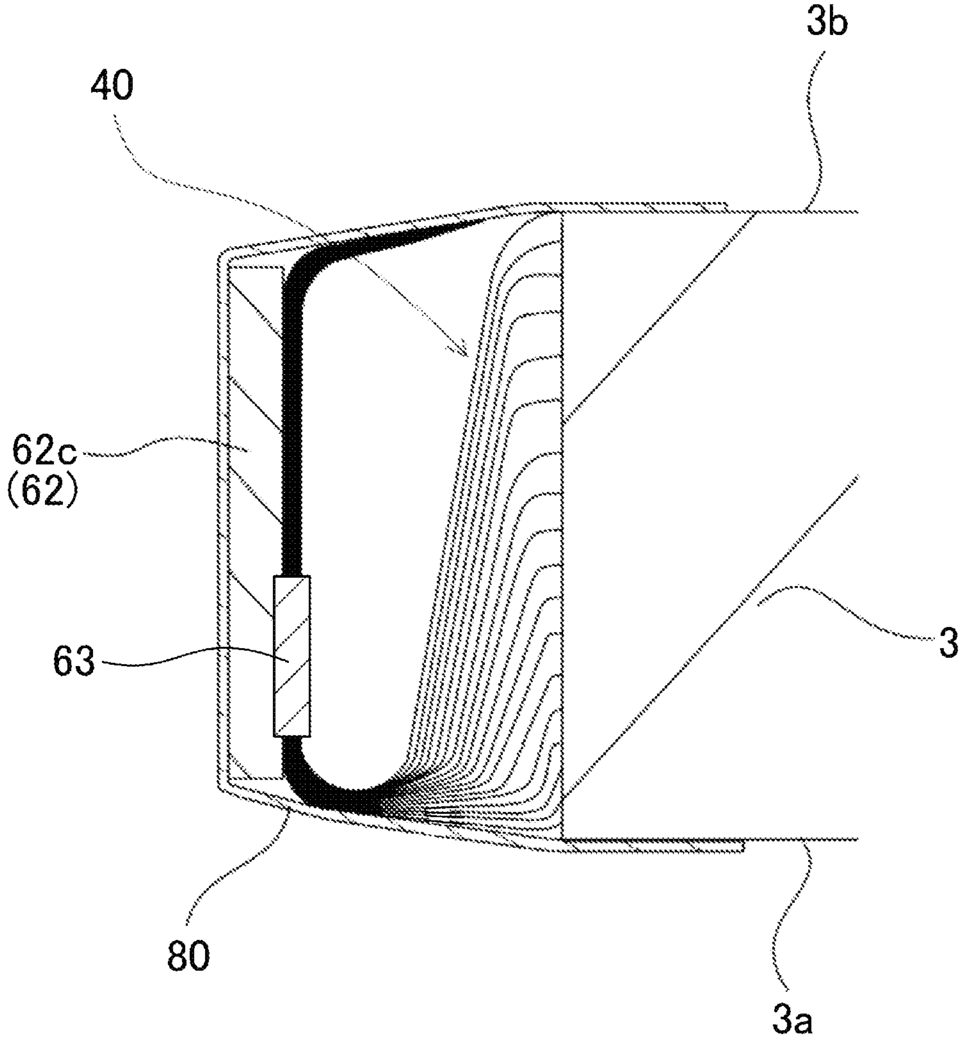
FIG. 4 shows the portion near the connection portion between the second current collector and the tab group after the tab group is bent.

As shown in FIG. 3, the tab group 40 extends from the electrode assembly 3 toward the side wall 1*b*, and is connected to the second current collector 62. As shown in FIG. 4, the tab group 40 is bent at a connection portion 63 with the second current collector 62 such that the bent tab group 40 extends parallel to the side wall 1*b*.

According to this configuration, the tab group 40 can be bent without bending the second current collector 62. A non-aqueous electrolyte secondary battery having a high volumetric energy density can thus be manufactured by a simple method.

In the above configuration, however, since the bent tab group 40 tries to return to its original straight shape, the second current collector 62 connected to the tab group 40 is subjected to a reaction force from the tab group 40. Therefore, when positioning the second current collector 62 on the first current collector 61 and joining them together, the positioning cannot be accurately performed.

Figure 5:
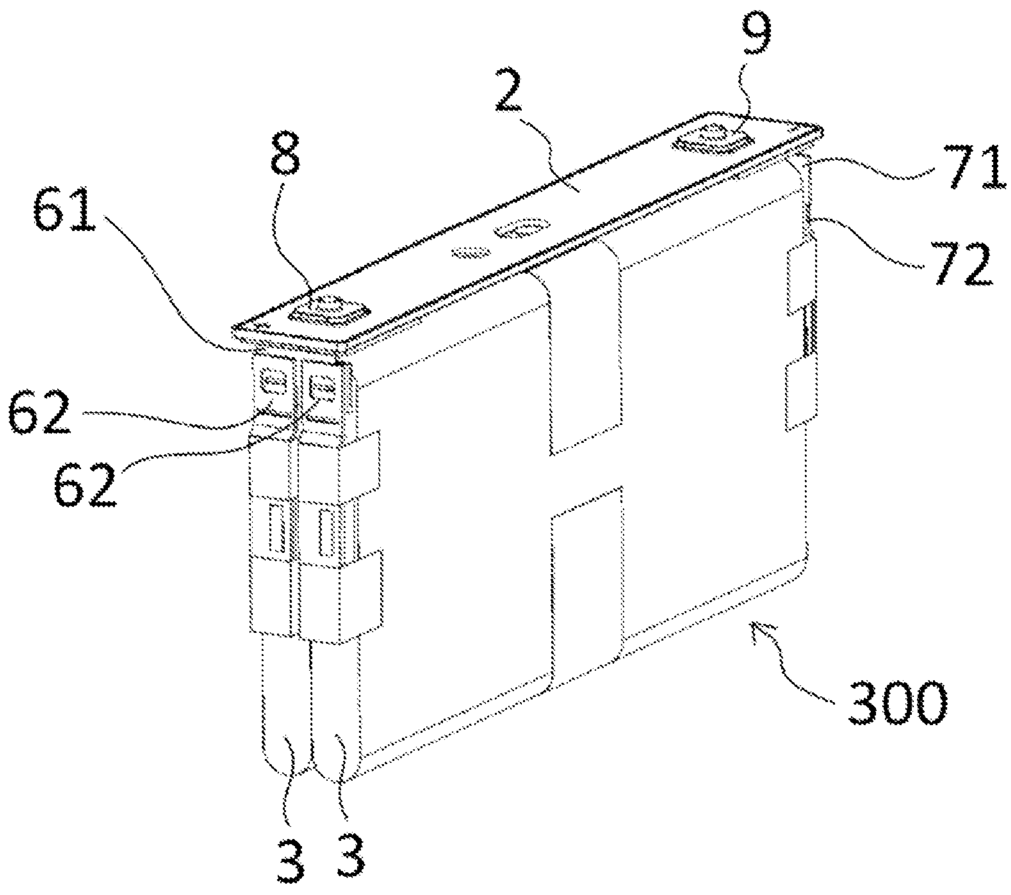
FIG. 5 shows a plurality of electrode assemblies and a sealing plate that are connected to each other by a first current collector and second current collectors according to the earlier application.

Particularly when the non-aqueous electrolyte secondary battery 20 includes a plurality of electrode assemblies 3 as shown in FIG. 5, one second current corrector 62 is connected to the tab group 40 of each electrode assembly 3. However, since each tab group 40 is bent in a different manner, each second current collector 62 will be subjected to a different reaction force. Accordingly, when positioning each second current collector 62 on the first current collector 61 and connecting them together, each second current collector 62 will be in a different position and attitude with respect to the first current collector 61. As a result, the second current collectors 62 cannot be joined with the first current collector 61, which result in problems such as poor electrical continuity and insufficient joining strength.

The inventors thought that these problems would be solved by providing a guide portion for positioning the second current collector 62 on the first current collector 61, and arrived at the invention.

An embodiment of the present disclosure will be described in detail with reference to the drawings. The following description of a preferred embodiment is merely illustrative and is not at all intended to limit the disclosure, its applications, or its uses. Since the basic configuration of a non-aqueous electrolyte secondary battery in the present embodiment is the same as in the earlier application, FIGS. 1, 3 and 4 used in the description of the earlier application are also used for the description of the embodiment.

Figure 6:
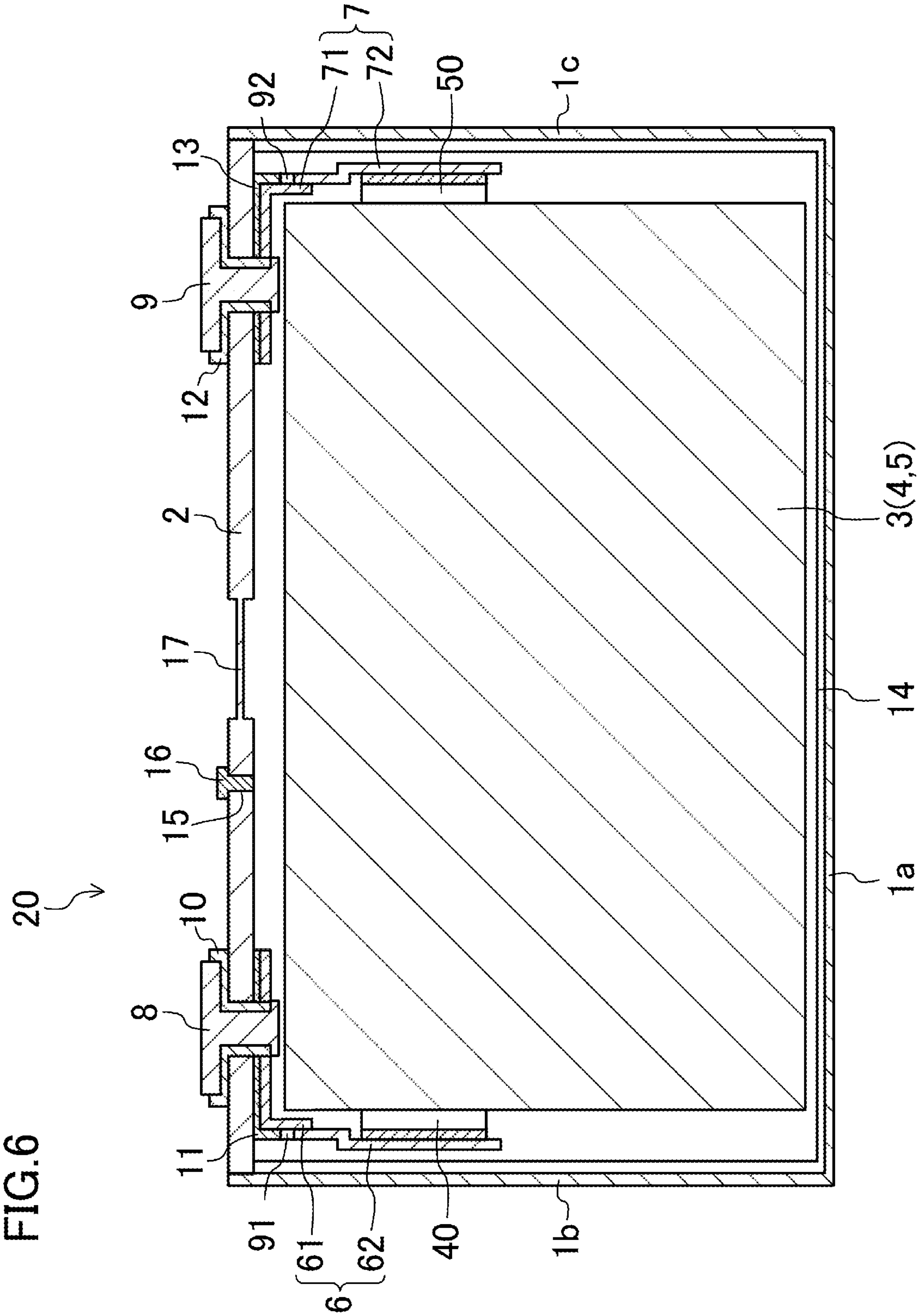
FIG. 6 is a sectional view showing the internal structure of a non-aqueous electrolyte secondary battery according to an embodiment.

FIG. 1 is a perspective view of a non-aqueous electrolyte secondary battery 20 according to the embodiment of the present disclosure. FIG. 6 is a sectional view showing the internal structure of the non-aqueous electrolyte secondary battery 20. FIG. 6 is the same as FIG. 2 except for illustration of guide portions 91, 92 that will be described later. As shown in FIGS. 1 and 6, the non-aqueous electrolyte secondary battery 20 includes a battery case 100 composed of a rectangular outer casing 1 in the shape of a bottomed rectangular tube having an opening and a sealing plate 2 that seals the opening of the rectangular outer casing 1.

The rectangular outer casing 1 includes a bottom 1*a*, a pair of first side walls 1*b*, 1*c*, and a pair of second side walls 1*d*, 1*e*. The pair of first side walls 1*b*, 1*c* is located so as to face each other. The pair of second side walls 1*d*, 1*e* is located so as to face each other. The pair of first side walls 1*b*, 1*c* is perpendicular to the longitudinal direction of the sealing plate 2, and the area of the pair of first side walls 1*b*, 1*c* is smaller than the area of the pair of second side walls 1*d*, 1*e*.

An electrode assembly 3 including a positive electrode plate 4 and a negative electrode plate 5 is housed together with an electrolyte in the rectangular outer casing 1. In the present embodiment, the electrode assembly 3 is a flat wound electrode assembly formed by winding the positive electrode plate 4 and the negative electrode plate 5 with a separator interposed therebetween. The winding axis of the electrode assembly 3 extends perpendicular to the first side walls 1*b*, 1*c* and parallel to the second side walls 1*d*, 1*e*. The electrode assembly 3 is not limited to the wound electrode assembly, and may be, for example, a stacked electrode assembly formed by stacking the positive electrode plate 4 and the negative electrode plate 5 with a separator interposed therebetween.

In FIG. 6, reference character 14 indicates a box- or bag-shaped insulation sheet disposed in the rectangular outer casing 1 and housing the electrode assembly 3. Reference character 15 indicates an electrolyte solution inlet in the sealing plate 2. Reference character 16 indicates a sealing member that seals the electrolyte solution inlet 15. Reference character 17 indicates a gas discharge valve in the sealing plate 2.

As used herein, the positive electrode side refers to one side of the non-aqueous electrolyte secondary battery 20 in the direction in which the winding axis of the electrode assembly 3 extends, and the negative electrode side refers to the other side of the non-aqueous electrolyte secondary battery 20. Hereinafter, the positive electrode side will be mainly described, and description of the negative electrode side may be omitted.

The electrode assembly 3 has a positive electrode tab group 40 at its one end in the direction in which the winding axis extends. Specifically, the positive electrode tab group 40 extends from the one end of the electrode assembly 3 toward the side wall 1*b*. The positive electrode tab group 40 is a stack of a plurality of positive electrode tabs.

Figure 7:
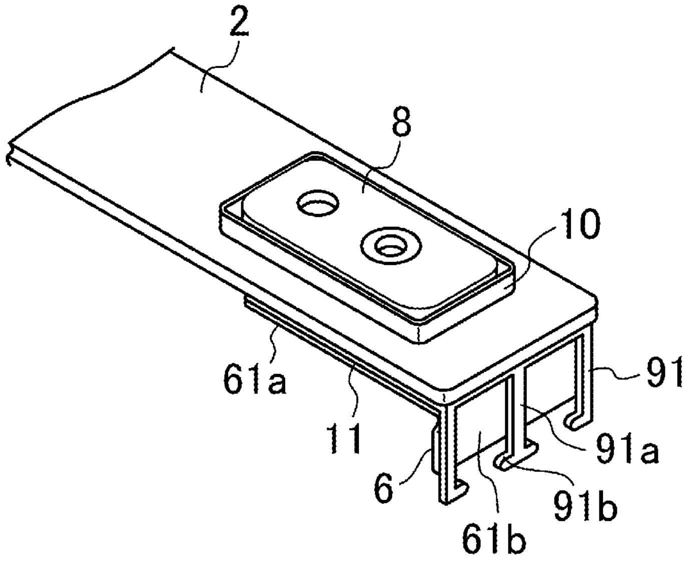
FIG. 7 is a perspective view showing a portion near a sealing plate.
Figure 8:
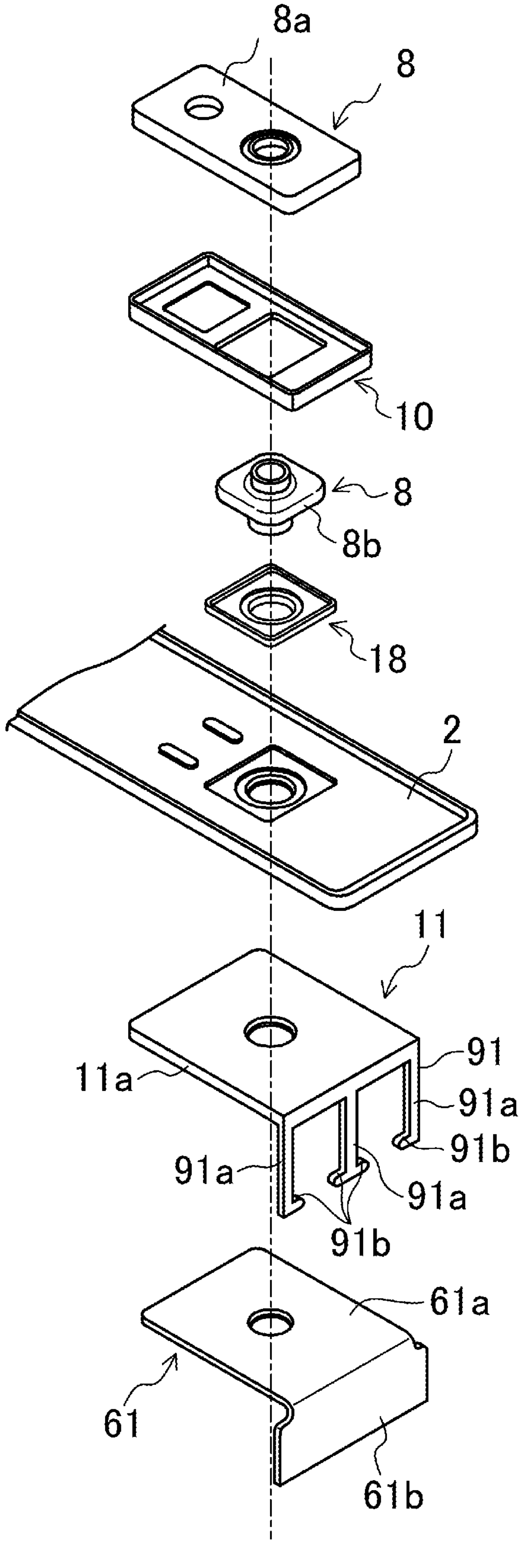
FIG. 8 is an exploded perspective view showing members near the sealing plate.

FIG. 7 shows a portion near the sealing plate 2. FIG. 8 is an exploded view showing each member near the sealing plate 2. A positive electrode terminal 8 as an electrode terminal is located on the outer side of the sealing plate 2. The positive electrode terminal 8 is composed of a main body 8*a* and a rivet portion 8*b*. The rivet portion 8*b* is detachably attached to the main body 8*a* and extends from the main body 8*a* toward the sealing plate 2. An outer insulation member 10 is disposed between the sealing plate 2 and the main body 8*a* of the positive electrode terminal 8.

A first positive electrode current collector 61 of a positive electrode current collector 6 is located on the inner side of the sealing plate 2. The first positive electrode current collector 61 has a substantially L-shape in section, and is disposed between the electrode assembly 3 and the sealing plate 2. Specifically, the first positive electrode current collector 61 has a first region 61*a* disposed along the sealing plate 2 and a second region 61*b* bent at the end of the first region 61*a*. The second region 61*b* extends toward the bottom 1*a* along the first side wall 1*b*.

An inner insulation member 11 is disposed between the sealing plate 2 and the first region 61*a* of the first positive electrode current collector 61. The inner insulation member 11 has a substantially L-shape in section corresponding to the shape of the first positive electrode current collector 61. Specifically, the inner insulation member 11 includes a main body 11*a* that covers the first region 61*a* of the first positive electrode current collector 61, and a guide portion 91 bent at the end of the main body 11*a*.

The guide portion 91 extends from the end of the main body 11*a* of the inner insulation member 11 toward the bottom 1*a* along the first side wall 1*b*. The guide portion 91 will be described in detail later.

A gasket 18 is disposed between a head of the rivet portion 8*b* and the sealing plate 2.

Each of the outer insulation member 10, the gasket 18, the sealing plate 2, the inner insulation member 11, and the first positive electrode current collector 61 has a concentric through hole. The rivet portion 8*b* of the positive electrode terminal 8 attached to the main body 8*a* is inserted through the through holes from the outer side. The rivet portion 8*b* of the positive electrode terminal 8 is then riveted on the first positive electrode current collector 61. The first positive electrode current collector 61 is thus connected to the positive electrode terminal 8.

A second positive electrode current collector 62 of the positive electrode current collector 6 is disposed between the electrode assembly 3 and the first side wall 1*b* of the rectangular outer casing 1. Specifically, the second positive electrode current collector 62 is a flat plate having a surface parallel to the first side wall 1*b*, and extends toward the bottom 1*a* along the first side wall 1*b*. The second positive electrode current collector 62 is connected to the first positive electrode current collector 61.

Figure 9:
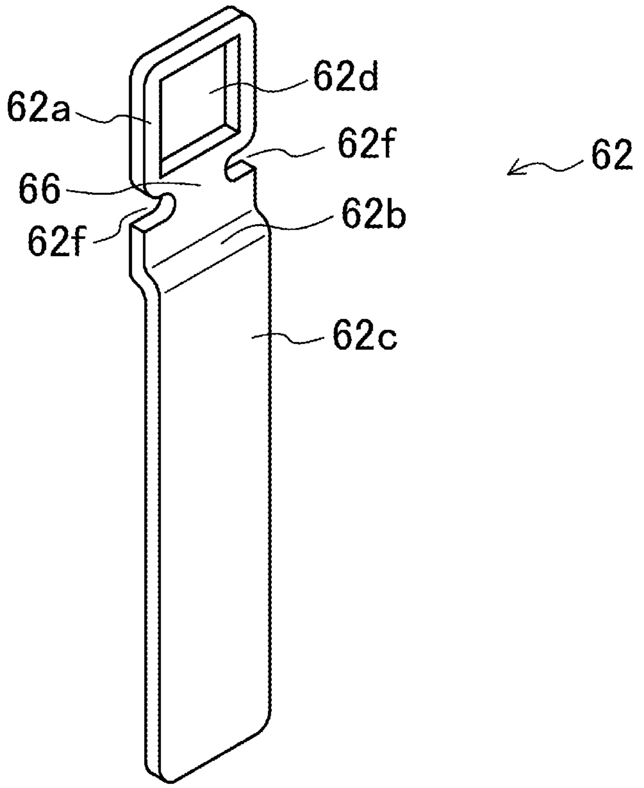
FIG. 9 is a perspective view of a second current collector.

FIG. 9 shows the second positive electrode current collector 62. The second positive electrode current collector 62 includes a current collector connection portion 62*a*, a tilted portion 62*b*, and a tab connection portion 62*c*. The current collector connection portion 62*a* is connected to the first positive electrode current collector 61. The positive electrode tab group 40 is connected to the tab connection portion 62*c*. The tilted portion 62*b* connects the current collector connection portion 62*a* and the tab connection portion 62*c*, and is tilted with respect to both of the current collector connection portion 62*a* and the tab connection portion 62*c*. The current collector connection portion 62*a* has a recess 62*d*. In the recess 62*d*, the current collector connection portion 62*a* is joined to the first positive electrode current collector 61.

The second positive electrode current collector 62 has a fuse portion 66. Since the fuse portion 66 has a smaller sectional area than the remaining portion of the flat plate, the fuse portion 66 is blown when an overcurrent flows through the second positive electrode current collector 62. As used herein, the sectional area means the area in section parallel to the lateral direction of the flat plate.

The second positive electrode current collector (flat plate) 62 has in its both lateral ends a pair of recesses 62*f* recessed inward in the lateral direction. These recesses 62*f* reduce the sectional area, forming the fuse portion 66.

Next, bending of the positive electrode tab group 40 and connection between the positive electrode tab group 40 and the second positive electrode current collector 62 will be described. FIG. 3 shows a portion near the connection portion between the second positive electrode current collector 62 and the positive electrode tab group 40 before the positive electrode tab group 40 is bent.

The positive electrode tab group 40 is connected to the tab connection portion 62*c* of the second positive electrode current collector 62. Specifically, as shown in FIG. 3, before the positive electrode tab group 40 is bent, the positive electrode tab group 40 is placed on the tab connection portion 62*c* of the second positive electrode current collector 62. In this state, the tab connection portion 62*c* and the positive electrode tab group 40 are joined (welded) together to form a connection portion 63.

As shown in FIG. 3, the positive electrode tab group 40 is connected to a part of the tab connection portion 62*c* of the second positive electrode current collector 62 that is located closer to one side in the lateral direction (right side in FIG. 3) of the flat plate. That is, the connection portion 63 between the positive electrode tab group 40 and the tab connection portion 62*c* is located closer to the root of the positive electrode tab group 40 in the lateral direction of the flat plate (i.e., closer the one side in the lateral direction, the right side in FIG. 3). With this configuration, a curved shape can be more reliably stably formed near the root of the positive electrode tab group 40 when the positive electrode tab group 40 is bent.

The positive electrode tab group 40 may be connected to the middle part of the tab connection portion 62*c* of the second positive electrode current collector 62 in the lateral direction of the flat plate.

FIG. 4 shows a portion near the connection portion between the second positive electrode current collector 62 and the positive electrode tab group 40 after the positive electrode tab group 40 is bent. By bending the positive electrode tab group 40, the tab connection portion 62*c* of the second positive electrode current collector 62 disposed substantially parallel to a first main surface 3*a* and a second main surface 3*b* of the electrode assembly 3 (see FIG. 3) is oriented to extend substantially perpendicular to the winding axis of the electrode assembly 3. That is, the positive electrode tab group 40 is bent at the connection portion 63 with the second positive electrode current collector 62 such that the bent positive electrode tab group 40 extends parallel to the first side wall 1*b*. The bent positive electrode tab group 40 is fixed to the electrode assembly 3 with a tape 80.

Figure 10:
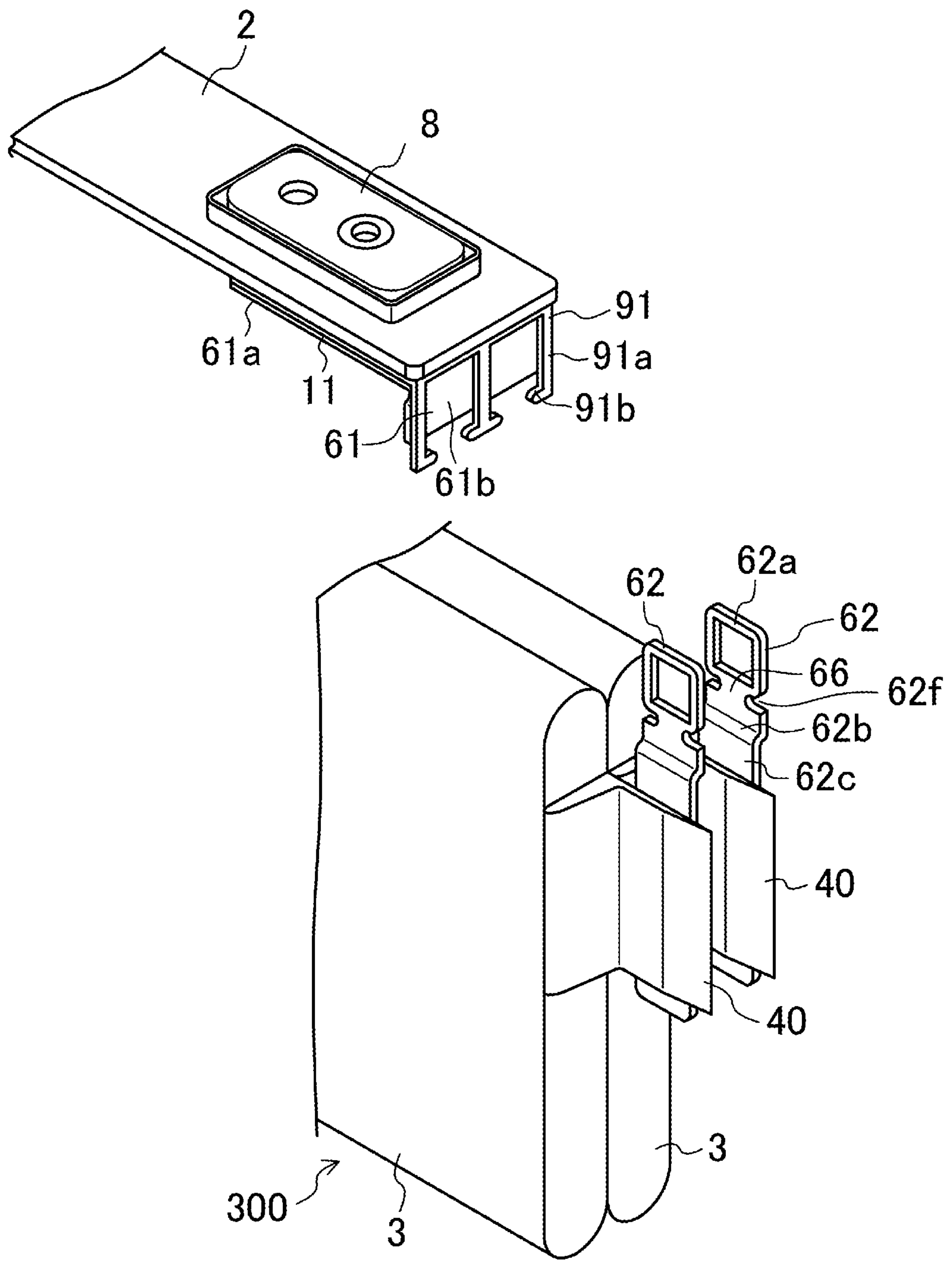
FIG. 10 shows arrangement of a plurality of electrode assemblies each having a second current collector connected to a tab group.

As shown in FIG. 10, the non-aqueous electrolyte secondary battery 20 includes a plurality of electrode assemblies 3. Each of a plurality of second positive electrode current collectors 62 is connected to a respective one of the positive electrode tab groups 40 of the electrode assemblies 3. The plurality of electrode assemblies 3 is arranged, and bundled and fixed together with a tape to form an electrode assembly group 300. The second positive electrode current collectors 62 provided for each electrode assembly 3 are connected to one first positive electrode current collector 61 disposed on the sealing plate 2.

Figure 11:
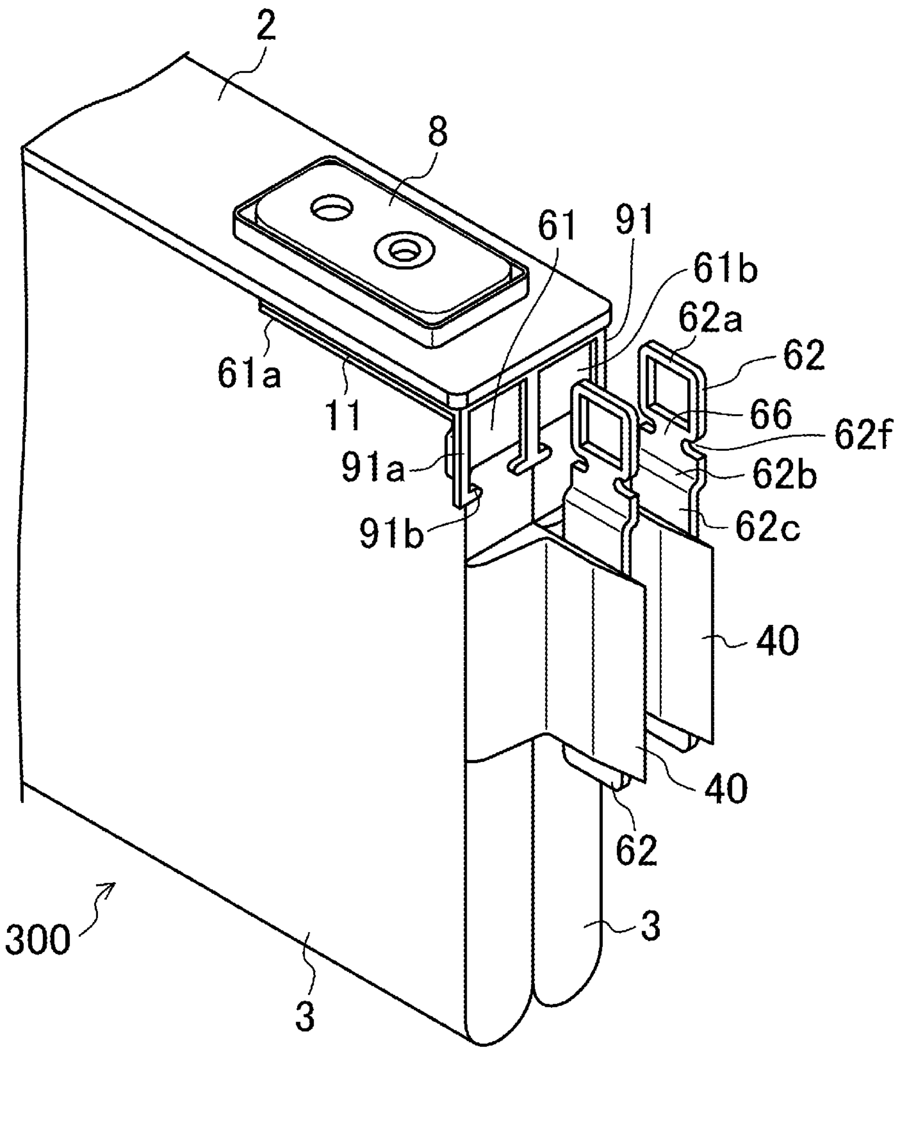
FIG. 11 illustrates how the second current collectors are connected to a first current collector (before the tab groups are bent).
Figure 12:
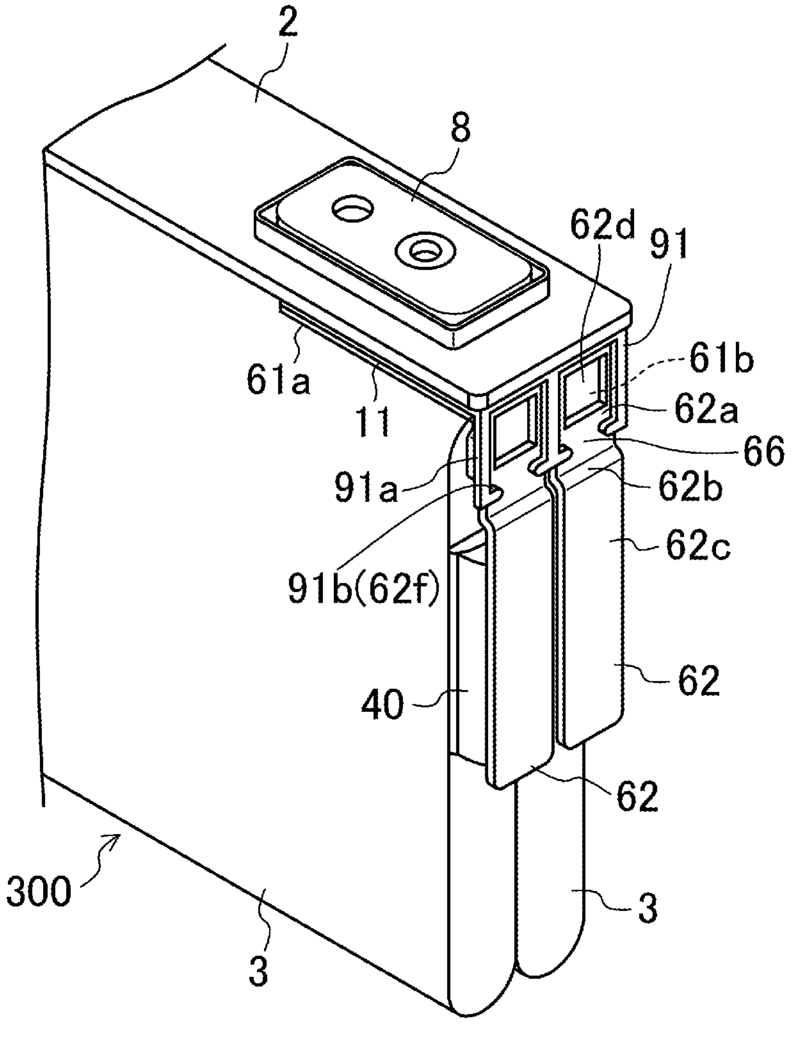
FIG. 12 illustrates how the second current collectors are connected to the first current collector (after the tab groups are bent).

FIGS. 11 and 12 illustrate how the second positive electrode current collectors 62 are connected to the first positive electrode current collector 61. FIG. 11 shows the state before the positive electrode tab groups 40 are bent, and FIG. 12 shows the state after the positive electrode tab groups 40 are bent.

As shown in FIG. 11, before the positive electrode tab groups 40 are bent, the sealing plate 2 is placed at such a position that each second positive electrode current collector 62 faces the first positive electrode current collector 61. As shown in FIG. 12, each positive electrode tab group 40 is bent such that each second positive electrode current collector 62 faces the first positive electrode current collector 61.

At this time, each second positive electrode current collector 62 is positioned on the first positive electrode current collector 61 by the guide portion 91. As used herein, the term "positioning" includes not only stopping the second positive electrode current collector 62 at a desired position but also maintaining a desired attitude of the second positive electrode current collector 62.

Hereinafter, the guide portion 91 will be described in detail. As described above, the guide portion 91 extends from the end of the main body 11*a* of the inner insulation member 11 toward the bottom 1*a* along the first side wall 1*b*. Specifically, the guide portion 91 has a pair of extending portions 91*a*. The pair of extending portions 91*a* extends along both lateral ends of the second positive electrode current collector 62. The second positive electrode current collector 62 is positioned on the first positive electrode current collector 61 by the pair of extending portions 91*a*.

The pair of extending portions 91*a* has a pair of protrusions 91*b* on their inner sides in the lateral direction. The pair of protrusions 91*b* protrudes inward in the lateral direction, and engages with the pair of recesses 62*f* of each second positive electrode current collector 62.

In the present embodiment, as shown in FIG. 12, the guide portion 91 has three extending portions 91*a*. The middle extending portion 91*a* extends along one lateral ends of the second positive electrode current collectors 62 located on both sides in the lateral direction of the middle extending portion 91*a*, and is used to position both of these second positive electrode current collectors 62.

It is preferable that the guide portion 91 be made of an insulation material and be integral with the inner insulation member 11.

According to this configuration, since each second positive electrode current collector 62 is positioned on the first positive electrode current collector 61 by the guide portion 91, the second positive electrode current collectors 62 and the first positive electrode current collector 61 can be connected easily.

Particularly when the non-aqueous electrolyte secondary battery 20 includes a plurality of electrode assembly 3 as in the present embodiment, the second positive electrode current collectors 62 can be aligned with each other in terms of the position and attitude with respect to the first positive electrode current collector 61. This reduces variation in position and attitude of the second positive electrode current collectors 62 with respect to the first positive electrode current collector 61 that is caused by the difference in reaction force each second positive electrode current collector 62 receives from the corresponding positive electrode tab group 40. Accordingly, each second positive electrode current collector 62 can be stably joined with the first positive electrode current collector 61, and the possibility of poor electrical continuity, insufficient joining strength, etc. can be reduced.

The present disclosure thus provides a non-aqueous electrolyte secondary battery having a high volumetric energy density and an easy-to-assemble structure.

Since the pair of extending portions 91*a* contacts both lateral ends of the second positive electrode current collector 62, the second positive electrode current collector 62 can be more reliably positioned in the lateral direction thereof.

Since the pair of protrusions 91*b* of the pair of extending portions 91*a* engage with the pair of recesses 62*f* of the second positive electrode current collector 62, the second positive electrode current collector 62 can be more reliably positioned in the longitudinal direction thereof (vertical direction in FIG. 12).

Since the guide portion 91 is integral with the inner insulation member 11, the assembly time can be reduced.

Figure 13:
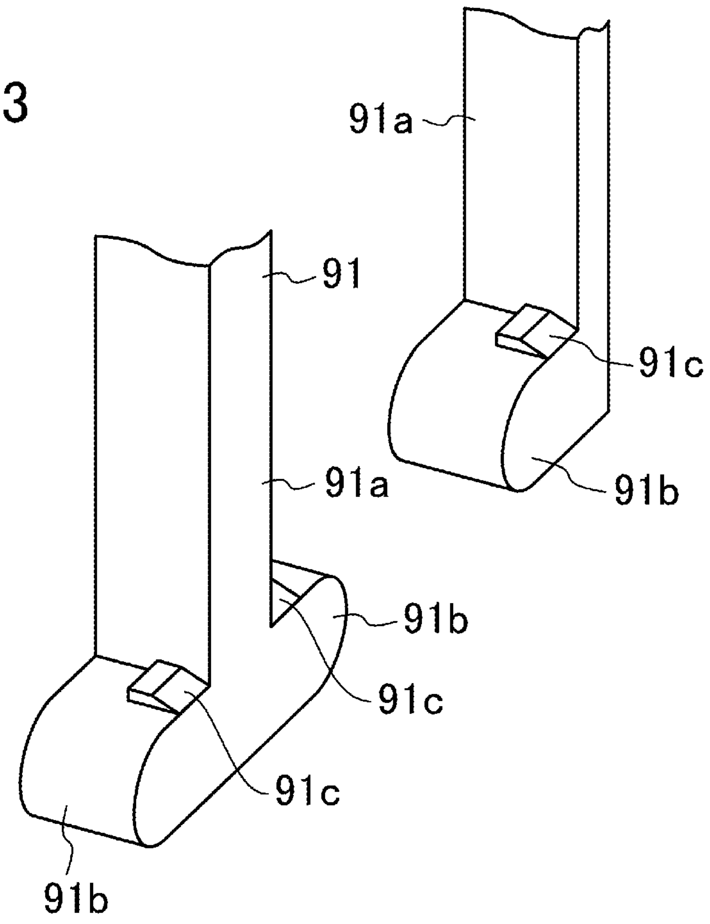
FIG. 13 shows a guide portion according to a first modification of the embodiment.

FIG. 13 shows the guide unit 91 according to a first modification of the present embodiment. In this modification, each of the pair of protrusions 91*b* has a stopper 91*c*. The stopper 91*c* restricts movement of the second positive electrode current collector 62 in the thickness direction. According to this configuration, the second positive electrode current collector 62 is less likely to separate from the first positive electrode current collector 61.

Figure 14:
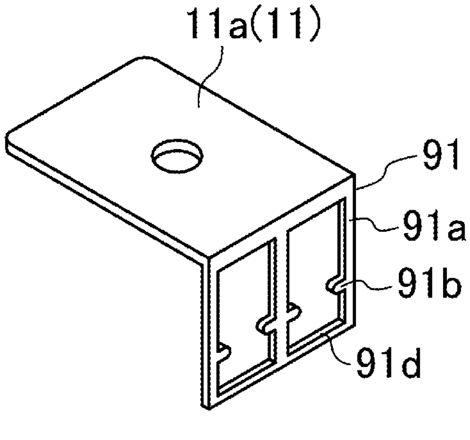
FIG. 14 shows a guide portion according to a second modification of the embodiment.

FIG. 14 shows the guide unit 91 according to a second modification of the present embodiment. In this modification, the guide portion 91 has a connection portion 91*d*. The connection portion 91*d* connects the tip ends of the pair of extending portions 91*a* to each other. According to this configuration, the guide portion 91 is reinforced by the connection portion 91*d*, and the strength of the guide portion 91 is improved.

The negative electrode side has a configuration similar to that of the positive electrode side. In FIG. 6, reference character 9 indicates a negative electrode terminal, reference character 50 indicates a negative electrode tab group, reference character 7 indicates a negative electrode current collector, reference character 71 indicates a first negative electrode current collector, reference character 72 indicates a second negative electrode current collector, reference character 12 indicates an outer insulation member, reference character 13 indicates an inner insulation member, and reference character 92 indicates a guide portion.

Although the present invention is described above based on a preferred embodiment, the above description is not restrictive, and various modifications can be made.

Figure 15:
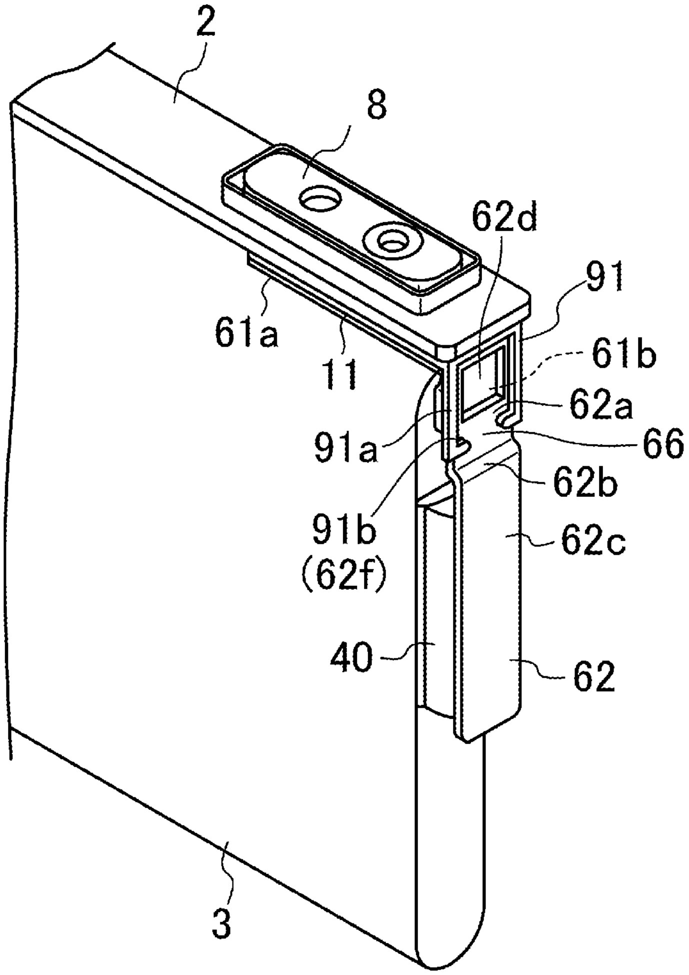
FIG. 15 is a diagram corresponding to FIG. 12, showing another embodiment.

The non-aqueous electrolyte secondary battery 20 according to the above embodiment includes the plurality of electrode assemblies 3 that forms the electrode assembly group 300. However, the present disclosure is not limited to this. As shown in FIG. 15, the non-aqueous electrolyte secondary battery 20 may include only one electrode assembly 3.

In the above embodiment, the guide portion 91 is integral with the inner insulation member 11. However, the present disclosure is not limited to this. For example, the guide portion 91 may be attached to the inner insulation member 11 with a bolt, nut, etc.

The material of the guide portions 91, 92 is not limited to the insulation material. The material of the guide portion 91 on the positive electrode side may be, for example, aluminum or an aluminum alloy. The material of the guide portion 92 on the negative electrode side may be, for example, copper or a copper alloy.

The guide portion 91 need not necessarily be provided directly on the inner insulation member 11. That is, the guide portion 91 may be indirectly provided on the inner insulation member 11. For example, the guide portion 91 may be provided on a protective cover connected to the inner side of the inner insulation member 11 and covering the first current collector 61 from the inner side.

In the present embodiment, the fuse portion 66 is formed by reducing the sectional area by the pair of recesses 62*f*. However, the present disclosure is not limited to this. The fuse portion 66 may be formed by forming a slit in the lateral direction of the flat plate as in the earlier application (see FIG. 5). In this case, the pair of recesses 62*f* are formed regardless of the function of the fuse portion 66. The fuse portion 66 may be formed in the first current collector 61 instead of the second current collector 62. In this case, the fuse portion 66 is not formed in the second current collector 62 but the pair of recesses 62*f* is formed in the second current collector 62. The pair of recesses 62*f* of the second current collector 62 and the pair of protrusions 91*b* of the pair of extending portions 91*a* of the guide portion 91 need not necessarily be provided.

DESCRIPTION OF REFERENCE CHARACTERS

1 Rectangular Outer Casing
1*b* First Side Wall (Side Wall)

2 Sealing Plate
3 Electrode Assembly
4 Positive Electrode Plate
5 Negative Electrode Plate
8 Positive Electrode Terminal (Electrode Terminal)
11 Inner Insulation Member (Insulation Member)
20 Non-Aqueous Electrolyte Secondary Battery
40 Positive Electrode Tab Group (Tab Group)
61 First Positive Electrode Current Collector (First Current Collector)
62 Second Positive Electrode Current Collector (Second Current Collector)
62*f* Pair of Recesses
63 Connection Portion
91 Guide Portion
91*a* Pair of Extending Portions
91*b* Pair of Protrusions
91*c* Stopper
91*d* Connection Portion

The invention claimed is:

1. A non-aqueous electrolyte secondary battery, comprising:

an electrode assembly including a positive electrode plate and a negative electrode plate;

a rectangular outer casing having an opening and housing the electrode assembly, the rectangular outer casing having a pair of first side walls and a pair of second side walls having a larger area than the pair of first side walls;

a sealing plate sealing the opening;

an electrode terminal located on the sealing plate;

a first current collector located between the electrode assembly and the sealing plate and connected to the electrode terminal;

an insulation member located between the sealing plate and the first current collector;

a second current collector located between the electrode assembly and one first side wall of the pair of first side walls of the rectangular outer casing and connected to the first current collector; and a tab group extending from the electrode assembly toward the one first side wall and connected to the second current collector, wherein the second current collector comprises a tab connection portion having a first planar shape extending in a direction parallel to the one first side wall, and a current collector connection portion having a second planar shape extending in the direction parallel to the one first side wall, the tab group is connected to the tab connection portion of the second current collector, and is bent at a connection portion with the second current collector such that the bent tab group extends parallel to the one first side wall, and the current collector connection portion of the second current collector is connected to a side surface of the first current collector, the side surface being parallel to the one first side wall, and is positioned on the first current collector by a guide portion extending from the insulation member.

2. The non-aqueous electrolyte secondary battery of claim 1, wherein the guide portion includes a pair of extending portions extending along both lateral ends of the second current collector, and the current collector connection portion of the second current collector is positioned on the first current collector by the pair of extending portions.

3. The non-aqueous electrolyte secondary battery of claim 2, wherein the second current collector includes a pair of recesses in the lateral ends, the pair of recesses being recessed inward in a lateral direction of the second current collector, and the pair of extending portions includes a pair of protrusions on their inner sides in the lateral direction, the pair of protrusions protruding inward in the lateral direction and engaging with the pair of recesses.

4. The non-aqueous electrolyte secondary battery of claim 3, wherein each of the pair of protrusions includes a stopper that restricts movement of the second current collector.

5. The non-aqueous electrolyte secondary battery of claim 2, wherein the guide portion includes a connection portion connecting tip ends of the pair of extending portions to each other.

6. The non-aqueous electrolyte secondary battery of claim 1, wherein the guide portion is made of an insulation material and is integral with the insulation member.

7. A non-aqueous electrolyte secondary battery, comprising:

a plurality of electrode assemblies each including a positive electrode plate and a negative electrode plate;

a rectangular outer casing having an opening and housing the plurality of electrode assemblies;

a sealing plate sealing the opening;

an electrode terminal located on the sealing plate;

a first current collector located between the plurality of electrode assemblies and the sealing plate and connected to the electrode terminal;

an insulation member located between the sealing plate and the first current collector;

a plurality of second current collectors each located between a respective one of the electrode assemblies and a side wall of the rectangular outer casing and connected to the first current collector; and a plurality of tab groups each extending from the respective one of the electrode assemblies toward the side wall and connected to a respective one of the plurality of second current collectors, wherein each of the plurality of second current collectors comprises a tab connection portion having a first planar shape extending in a direction parallel to the side wall, and a current collector connection portion having a second planar shape extending in the direction parallel to the side wall, each of the plurality of tab groups is connected to the tab connection portion of the respective one of the plurality of second current collectors, and is bent at a connection portion with the respective one of the plurality of second current collectors such that the bent tab group extends parallel to the side wall, and the current collector connection portion of the respective one of the second current collectors is positioned on the first current collector by a guide portion extending from the insulation member.

* * * * *